United States Patent

[11] 3,621,471

[72] Inventor Rudolf Dick
Eningen, Germany
[21] Appl. No. 880,116
[22] Filed Nov. 26, 1969
[45] Patented Nov. 16, 1971
[73] Assignee Wandel u. Goltermann
Reutlingen, Germany
[32] Priority Nov. 27, 1968
[33] Germany
[31] P 18 11 145.0

[54] RESONANT NETWORK WITH REACTIVELY COUPLED FET PROVIDING LINEAR VOLTAGE/FREQUENCY RESPONSE
9 Claims, 3 Drawing Figs.

[52] U.S. Cl. .......... 332/16 T, 307/251, 331/108, 332/28, 333/80 T
[51] Int. Cl. .......... H03c 3/10
[50] Field of Search .......... 332/16, 16 T, 28; 307/251, 304; 331/108, 117, 177, 177 V, 180; 333/80, 80 T

[56] References Cited
UNITED STATES PATENTS

| | | | |
|---|---|---|---|
| 2,382,436 | 8/1945 | Marble | 332/28 UX |
| 2,441,504 | 5/1948 | O'Brien | 332/28 X |
| 2,521,694 | 9/1950 | Crosby | 332/28 X |
| 2,749,518 | 6/1956 | Shadowitz | 332/28 |
| 2,758,211 | 8/1956 | Hochman | 332/28 X |
| 3,436,681 | 4/1969 | Hart | 331/117 |

OTHER REFERENCES

Butler, " Application of Metal Oxide Silicon Transistors," Wireless World, Feb. 1965, pp. 58- 61 331- 108

*Primary Examiner*—Alfred L. Brody
*Attorney*—Karl F. Ross

ABSTRACT: A field-effect transistor with two gates has a resistance and a reactance serially connected across its drain and source, with one gate tied to the junction of these two impedances whereas the other gate has a modulating signal applied to it. The resistance may be constituted by the output circuit of a differential transistor amplifier having its input connected in parallel with drain and source of the field-effect transistor.

Rudolf Dick
INVENTOR.

BY

Karl F. Ross
Attorney

RESONANT NETWORK WITH REACTIVELY COUPLED FET PROVIDING LINEAR VOLTAGE/FREQUENCY RESPONSE

My present invention relates to an impedance network constituting or including an electrically adjustable reactance, e.g., for use in the tank circuit of a tunable oscillator In the tuning of resonant circuits for oscillators and the like it is desirable to have a substantially linear relationship between the resonance frequency and the control voltage applied to the reactive branch of the circuit. In conventional systems in which this reactive branch includes an active element of the variable-gain type, such linearity is generally not realizable without the use of separate equalizing networks or the like. These equalizers are, as a rule, of complex construction even when designed for the linearization of only a relatively narrow frequency range.

It is, therefore, the principal object of my present invention to provide an improved and uncomplicated impedance network whose reactance $Z$ varies generally according to the law $$Z=K/V^2$$

where $V$ is the applied voltage. This relationship provides the desired linearity, in regard to the resonance frequency $f$, according to the well-known formula where the inductance $L$ or the capacitance $C$ is constituted by the adjustable reactance $Z$.

A more specific object is to provide an impedance network with an inductive or capacitive reactance variable in the aforedescribed manner over an extended range.

These objects are realized, in accordance with my invention, by the use of a solid-state active element with two output electrodes and two control electrodes, one control electrode being tied to the junction of a predominantly reactive first impedance and a preferably resistive second impedance serially connected across a pair of load terminals as a phase-shifting circuit; upon the application of a modulating voltage to the other control electrode, the effective reactance measured across these terminals varies as a function of the applied voltage. This reactance will be either capacitive or inductive, depending on the character and position of the predominantly reactive series resistance of the phase shifter.

I have found pursuant to a more particular feature of this invention, that an especially good linearization of the resulting resonance frequency (in an oscillatory circuit in which this network forms one of the reactive branches) is achieved by the use of a twin-gate field-effect transistor as the solid-state active element.

The second, predominantly resistive series impedance of the phase shifter bridged across the load terminals may be constituted by an ancillary amplifier having its input circuit connected across these terminals. Advantageously, this ancillary amplifier comprises two differentially connected transistor stages, the first transistor stage having its base/collector circuit in parallel with the source/drain circuit of the field-effect transistor so as to be responsive to the reactive voltage developed across the latter transistor; the emitter/collector circuit of the second stage then constitutes a high-ohmic branch of the phase-shifting circuit.

The invention will be described in greater detail hereinafter with reference to the accompanying drawing in which.

Figure 1:
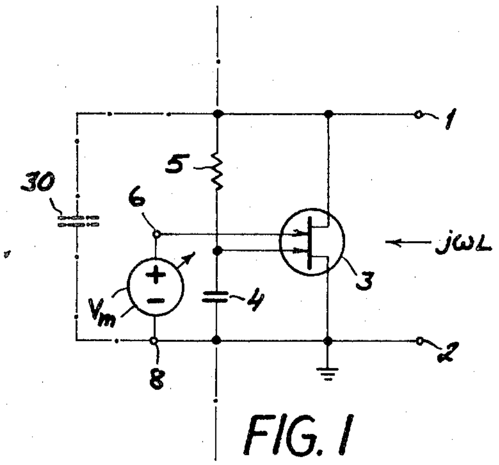
FIG. 1 is a circuit diagram of an impedance network embodying the invention.

The embodiment illustrated in FIG. 1 comprises a pair of load terminals 1, 2, terminal 2 being grounded; an alternating voltage of pulsatance $\omega$ from an external source (not shown) is assumed to be present on these terminals. A twin-gate field-effect transistor 3 has its drain and source electrodes respectively connected to these terminals in parallel with a phase-shifting circuit consisting of a capacitor 4 and a resistor 5. One gate of field-effect transistor 3 is tied to the junction of impedances 4 and 5; the other gate is connected to a terminal 6 to receive a modulating voltage from a source $V_m$ lying between this terminal and a grounded terminal 8. Source $V_m$ is representative of any manually or automatically adjustable means for producing a control voltage of variable magnitude; the polarity of that voltage depends, of course, on the conductivity type of the field-effect transistor 3.

With element 5 designed as a high-ohmic resistance, the impedance of the two-terminal network 3 – 5 as seen from terminals 1. 2 is essentially inductive and given by $j\omega L$, L varying substantially linearly with the reciprocal of the square of the applied control voltage $V_m$. Thus, the network can be used as a reactive branch of an oscillatory circuit having a complementary (here capacitive) reactive branch in parallel or in series therewith, as diagrammatically illustrated by a condenser 30 in FIG. 1.

Figure 2:
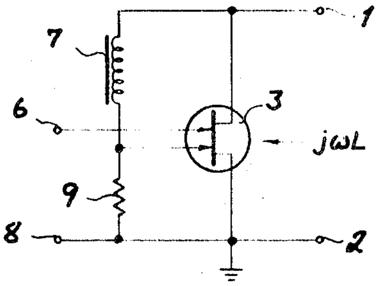
FIG. 2 is a diagram similar to FIG. 1, showing a modification.

FIG. 2 shows a similar network of inductive character wherein, however, the phase-shifting circuit controlling the field-effect transistor 3 is constituted by an inductance 7 in series with a resistor 9. If the inductance 7 were replaced by the capacitance 4 of FIG. 1, or vice versa, the character of the network impedance would be capacitive.

Figure 3:
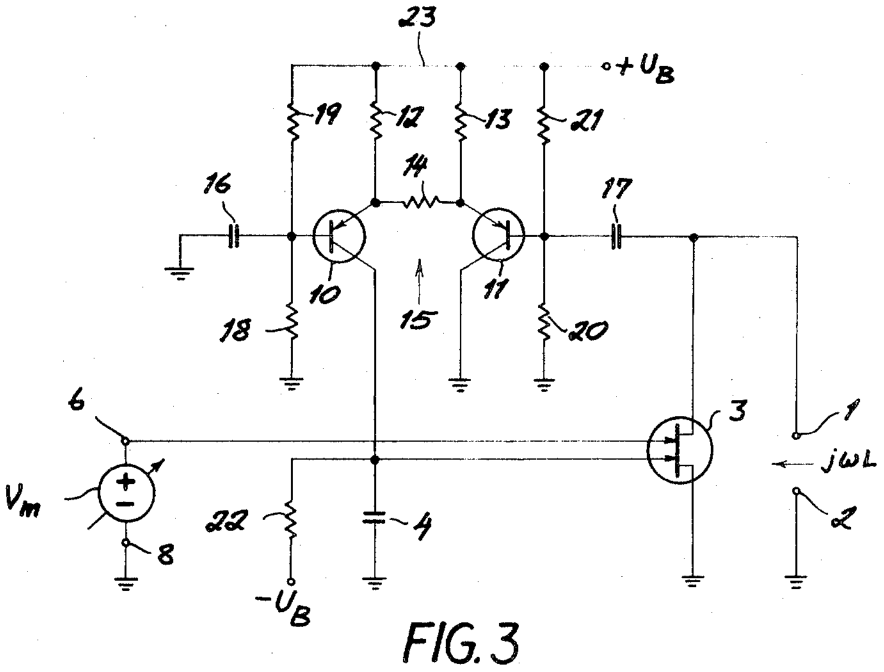
FIG. 3 is a circuit diagram of a more elaborate impedance network generally similar to that of FIG. 1.

In FIG. 3 I have shown a network similar to that of FIG. 1 wherein, however, the resistive branch 5 of the phase shifter has been replaced by a two-stage amplifier 15 comprising a pair of PNP-transistors 10 and 11. The emitter and collector of the first transistor stage 11 are connected in series with a resistor 13 between ground and a bus bar 23 leading to a source of positive biasing potential $+U_B$, in parallel with a voltage divider constituted by two series resistors 20, 21 whose junction is tied to the base of transistor 11; this junction is also connected through a coupling condenser 17 to the ungrounded load terminal 1. The base of the second transistor stage 10 is grounded for high frequency through another coupling condenser 16 and is further tied to the junction of two series resistors 18, 19 inserted between bus bar 23 and ground. Bus bar 23 is also connected to the emitter of transistor 10 through a resistor 12 forming part of a $\pi$-network which includes the emitter resistor 13 of transistor 11 as well as a further resistor 14. The collector of transistor 10, aside from being connected to the junction of condenser 4 with the first gate of field-effect transistor 3, is led to a source of negative biasing potential $-U_B$ through a high-ohmic resistor 22.

Amplifier 15, lying in a feedback path of transistor 3, magnifies the effect of the modulating voltage $V_m$ upon the reactance $j\omega L$ of transistor 3; the high base/collector resistance of amplifier stage 11 and the high-ohmic resistors 20 and 21 have only a negligible shunting effect upon this reactance. The principle of combining a feedback amplifier with a controlled reactance element is known per se, e.g. from German printed specification No. 1,274,679 to which reference may be made for a determination of the mathematical relationships between the several impedances of the network.

The field-effect transistor 3 is advantageously of the metal-oxide-semiconductor type, known as MOSFET, described for example in the June 1967 issue of IEEE spectrum pp. 50 – 58.

I claim:

1. A two-terminal impedance network comprising a pair of load terminals energizable by alternating current; a field-effect transistor with a source and a drain respectively connected to said terminals, said transistor having a first and a second gate electrode; a pair of impedances serially connected across said terminals, at least one of said impedances being predominantly reactive, said first gate electrode being connected to the junction of said impedances; and a supply of modulating signal connected between said second gate electrode and one of said terminals.

2. A network as defined in claim 1 wherein said field-effect transistor is of the metal-oxide-semiconductor type.

3. A network as defined in claim 1 wherein one of said impedances is predominantly resistive.

4. A network as defined in claim 3 wherein said predominantly resistive impedance comprises an output circuit of an ancillary amplifier having an input circuit connected across said terminals.

5. A network as defined in claim 4 wherein said ancillary amplifier comprises two differentially connected transistor stages.

6. A network as defined in claim 5 wherein said stages each have a base, an emitter and a collector, said source and drain being connected across the base/collector circuit of one of said transistor stages, the other of said transistor stages having an emitter/collector circuit in series with said predominantly reactive impedance.

7. A circuit arrangement including a resonant circuit with a first reactive branch comprising a network as defined in claim 1 and a second, complementary reactive branch connected to said load terminals.

8. A circuit arrangement as defined in claim 7 wherein said predominantly reactive impedance is constructed and positioned to make the impedance of said network essentially inductive.

9. A circuit arrangement as defined in claim 8 wherein said second reactive branch comprises a condenser connected across said load terminals.

* * * * *